US012767553B2

(12) United States Patent
Tan et al.

(10) Patent No.: US 12,767,553 B2
(45) Date of Patent: Oct. 20, 2026

(54) PREPARATION PROCESS FOR MONOCLINIC TITANIUM DIOXIDE

(71) Applicant: Pacific Industrial Development Corporation, Ann Arbor, MI (US)

(72) Inventors: Bing Tan, Ann Arbor, MI (US); Charles R. Doenitz, Plymouth, MI (US); Yuhao Liao, Ann Arbor, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 0 days.

(21) Appl. No.: 18/873,363

(22) PCT Filed: Aug. 24, 2023

(86) PCT No.: PCT/US2023/031020
§ 371 (c)(1),
(2) Date: Dec. 10, 2024

(87) PCT Pub. No.: WO2024/049697
PCT Pub. Date: Mar. 7, 2024

(65) Prior Publication Data

US 2025/0313489 A1 Oct. 9, 2025

Related U.S. Application Data

(60) Provisional application No. 63/402,502, filed on Aug. 31, 2022.

(51) Int. Cl.
*C01G 23/08* (2006.01)
*H01M 4/04* (2006.01)
(Continued)

(52) U.S. Cl.
CPC .......... *C01G 23/08* (2013.01); *H01M 4/0404* (2013.01); *H01M 4/1391* (2013.01); *H01M 4/48* (2013.01);
(Continued)

(58) Field of Classification Search
CPC .. C01G 23/08; H01M 4/0404; H01M 4/1291; H01M 4/48
See application file for complete search history.

(56) References Cited

U.S. PATENT DOCUMENTS 9,508,981 B2 11/2016 Inagaki et al.
2002/0058141 A1 * 5/2002 Hareyama ............ C01G 23/005 252/500

(Continued)

FOREIGN PATENT DOCUMENTS

CN 101842923 A 9/2010
CN 105428722 * 3/2016 .......... H01M 10/058

(Continued)

OTHER PUBLICATIONS

English translation of JP 2017-149608.*

(Continued)

*Primary Examiner* — Bret P Chen
(74) *Attorney, Agent, or Firm* — Dickinson Wright PLLC

(57) ABSTRACT

A method for preparing titanium dioxide that includes the steps of providing at least one titanium precursor: providing one or more potassium precursors: mixing the at least one titanium precursor with the one or more potassium precursors to form a mixture: wherein the mixture has a potassium to titanium (K/Ti) molar ratio of 2.0/4.0<K/Ti<2.0/2.4; sintering the mixture at a temperature in the range of 750° C. to 900° C. for a predetermined time to form a powder: soaking the heated powder in an acidic solution: collecting and drying the acid-soaked powder: and treating the collected powder thermally at a temperature in the range of 300° C. to 500° C. for a predetermined time to form the $TiO_2$. The titanium oxide formed has a monoclinic crystal structure. $TiO_2$(B), as its major crystal phase with a mass percentage that is >50% of the overall mas of the $TiO_2$.

18 Claims, 6 Drawing Sheets

(51) Int. Cl.
*H01M 4/1391* (2010.01)
*H01M 4/48* (2010.01)
*H01M 10/0525* (2010.01)

(52) U.S. Cl.
CPC ..... *H01M 10/0525* (2013.01); *C01P 2002/52* (2013.01); *C01P 2002/72* (2013.01); *C01P 2002/76* (2013.01); *C01P 2006/40* (2013.01)

(56) References Cited

U.S. PATENT DOCUMENTS

| | | | | |
|---|---|---|---|---|
| 2005/0191492 A1* | 9/2005 | Yadav | C09C 1/3684 | |
| | | | 428/407 | |
| 2012/0115032 A1* | 5/2012 | Harada | H01M 4/02 | |
| | | | 423/598 | |

FOREIGN PATENT DOCUMENTS

| | | | | |
|---|---|---|---|---|
| CN | 105858721 | * | 8/2016 | C01G 23/047 |
| CN | 108630908 | * | 10/2018 | H01M 4/36 |
| CN | 110291667 A | * | 9/2019 | H01M 4/485 |
| CN | 109904439 B | | 2/2022 | |
| EP | 2181964 | * | 5/2010 | C01G 23/00 |
| JP | 2015-187929 | * | 10/2015 | H01M 4/13 |
| JP | 2017-149608 | * | 8/2017 | C01G 23/04 |

OTHER PUBLICATIONS

English translation of CN 105428722.*

Wang, Yang, et al., “A novel method to synthesis titanium dioxide(B)/Anatase composite oxides by solid-state chemical reaction routes for promoting Li+ insertion”. Results in Physics 14 (2019) 102451, pp. 1-4.*

Xiaoli, Ji, et al., “Preparation of layered potassium titanate whiskers with large length-diameter ratio by KDC method”. Journal of Wuhan University of Technology-Mater. Sci. Ed., Aug. 2014, pp. 669-673.*

Ambat, Indu, et al., “Application of Potassium lon Impregnated Titanium Dioxide as Nanocatalyst for Transesterification of Linseed Oil”. Energy & Fuels 2018 32 (11), 11645-11655.*

Wang, Xin-Yu et al: “Synthesis and electrochemical performance of TiO2-B as anode material,” Journal of Central South University, Central South University, Changsha, vol. 18, No. 2, Apr. 1, 2011 (Apr. 1, 2011), pp. 406-410, XP036946487, ISSN 2095-2899, DOI: 10.1007/S11771-011-0711-9.

Arrouvel, Corinne et al: “Lithium Insertion and Transport in the TiO2-B Anode Material: A Computational Study,” Chemistry of Materials Article, Department of Chemistry, University of Bath, Chem. Mater. 2009, 21, pp. 4778-4783, DOI:10.1021/cm900373u.

Izawa, H. et al: “Ion Exchange and Dehydration of Layered Titanates, Na2Ti3O7 and K2Ti4O9,” The Journal of Physical Chemistry, vol. 86, No. 25, 1982, The Institute of Scientific and Industrial Research, Osaka University, Osaka, Japan, pp. 5023-5026.

Akimoto, Junji et al: “Soft-Chemical Synthesis and Electrochemical Property of H2Ti12025 as a Negative Electrode Material for Rechargeable Lithium-Ion Batteries,” National Institute of Advanced Industrial Science and Technology, Japan, Department of Pure and Applied Chemistry, Faculty of Science and Technology, Tokyo University of Science, Japan, Journal of The Electrochemical Society, 158 (5) pp. A546-A549 (2011).

Feist, Thomas P. et al: “The Soft Chemical Synthesis of TiO2 (B) from Layered Titanates,” Department of Materials Science and Engineering, University of Pennsylvania, Philadelphia, Journal of Solid State Chemistry 101, pp. 275-295 (1992).

European Patent Office, Rijswijk, Netherlands, International Search Report of International Application No. PCT/US2023/031020, Mailed Nov. 27, 2023, 4 pages.

* cited by examiner

PREPARATION PROCESS FOR MONOCLINIC TITANIUM DIOXIDE

CROSS REFERENCE TO RELATED APPLICATIONS

This application is a national stage filing of International Application No. PCT/US2023/031020 filed on Aug. 24, 2023, designating the United States and published in English, which claims the benefit of the filing date under 35 U.S.C. § 119(e) of U.S. Provisional Application No. 63/402,502 filed on Aug. 31, 2022, the entire contents of which are incorporated herein by reference in their entirety.

FIELD

This invention generally relates to the preparation of titanium dioxide. More specifically, the present disclosure relates to the preparation of titanium dioxide that predominantly has a monoclinic crystal structure and devices that incorporate such $TiO_2$(B) material.

BACKGROUND

The statements in this section merely provide background information related to the present disclosure and may not constitute prior art.

Titanium dioxide ($TiO_2$) generally exhibits four different crystal structures, namely, anatase, rutile, brookite, and monoclinic. Titanium dioxide that has the monoclinic crystal structure is often referred to as $TiO_2$(B). Over the past decade, $TiO_2$(B) has been actively investigated for use as an anode active material due to its high theoretical capacity. However, $TiO_2$(B) has a metastable crystal phase, which makes its preparation very difficult. One conventional process used to form $TiO_2$(B) involves first preparing an alkaline metal titanate, followed by ion-exchange to replace the alkaline metal ion with a proton ion, thereby, forming a hydrogen titanate. Alkaline metal titanates, which exhibit a layered structure, can have the alkaline metal ions readily exchanged with H+ ions in an acidic solution. Finally, dehydration of the hydrogen titanates at moderate temperature leads to the formation of $TiO_2$(B).

Monoclinic titanium dioxide, $TiO_2$(B), is prepared from either sodium titanate ($Na_2Ti_3O_7$) or potassium titanate ($K_2Ti_4O_9$). Potassium titanate is generally preferred over sodium titanate because of the difficultly associated with removing all of the sodium ions (Na+) during an ion-exchange process. Thus, the use of potassium titanate allows for the formation of $TiO_2$(B) having less impurities incorporated therein. Various temperatures and K/Ti ratios have been reported for the synthesis of pure phase $K_2Ti_4O_9$. However, most of these reports have not correlated the effect of the synthesis conditions with the electrochemical performance of $TiO_2$(B) as the anode active material. The reported synthesis conditions with $TiO_2$(B) as the anode active material were carried out at a high sintering temperature (i.e., ≥950° C.) with the use of a significant excess of $K_2CO_3$. An excess amount of $K_2CO_3$ is necessary because of its high evaporation rate. The evaporation rate of $K_2CO_3$ affects the selected process conditions and makes the scale-up of the manufacturing process extremely challenging. In order to simplify the scale-up of such a manufacturing process, it is desirable to reduce the sintering temperature. A reduced sintering temperature may also provide additional benefits, such as lowering the energy consumed during production, thereby, reducing the overall cost of manufacturing.

SUMMARY

This disclosure generally provides a method for preparing titanium oxide ($TiO_2$) for use as an active battery material. This method comprises the steps of: providing at least one titanium precursor; providing one or more potassium precursors; mixing the at least one titanium precursor with the one or more potassium precursors to form a mixture; wherein the mixture has a potassium to titanium (K/Ti) molar ratio of 2.0/4.0<K/Ti<2.0/2.4, alternatively, the K/Ti molar ratio is in the range of 2/3.5 to 2/3; sintering the mixture at a temperature in the range of 750° C. to 900° C., alternatively in the range of 800° C. to 850° C. for a predetermined time to form a powder; soaking the heated powder in an acidic solution; collecting and drying the acid-soaked powder; and treating the collected powder thermally at a temperature in the range of 300° C. to 500° C. for a predetermined time to form the $TiO_2$. Alternatively, the thermal treatment of the collected and dried powder is performed at a temperature in the range of 350° C. to 450° C.

According to one aspect of the present disclosure, the $TiO_2$ comprises $TiO_2$(B) having a monoclinic crystal structure as its major crystal phase with a mass percentage that is >50% of the overall mas of the $TiO_2$. When desirable, the $TiO_2$ may further comprise an anatase crystal phase with a mass percentage that is greater than 0% and less than 50%.

The titanium precursor used in the method is generally an oxide of titanium. The titanium precursor may exhibit an amorphous structure, an anatase crystal structure, a rutile crystal structure, or a brookite crystal structure. Alternatively, titanium precursor is $TiO_2$.

The potassium precursor is at least one selected from the group consisting of KHCO3, KOH, KCl, K2SO4, KNO3, $K_2CO_3$, or a mixture thereof. Alternatively, the potassium precursor is $K_2CO_3$.

According to another aspect of the present disclosure, the $TiO_2$ may further comprise a dopant (D), wherein the dopant includes at least one element other than potassium, titanium, or oxygen. This dopant (D) generally comprises Li, Mg, Ca, Sr, Ba, Nb, W, Zr, Mo, Al, C, Si, Sn, Pb, or a mixture thereof. Alternatively, the dopant (D) comprises V, Cr, Mn, Fe, Co, Ni, Cu, Zn, La, Ce, Sb, Bi, or a mixture thereof. The molar ratio of dopant to titanium (D/Ti) may be ≤0.3.

The acidic solution generally comprises a mineral acid. This acidic solution may comprise $H_2SO_4$, HCl, $HNO_3$, $H_3PO_4$, or mixture thereof.

According to another aspect of the present disclosure, a method of producing an energy storage device is provided. This method generally comprises forming $TiO_2$(B) as discussed above and as further defined herein, followed by incorporating the $TiO_2$(B) into the energy storage device. The method of forming an energy storage device may further comprise mixing the $TiO_2$(B) with a binder and carbon additives to form a coating composition; and applying the coating composition to a substrate to form an electrode film having a mass percentage of $TiO_2$(B) in the range of 1% to 99%.

This energy storage device that is formed may be a lithium ion cell. This energy storage device may comprise at least one cathode active material selected from $LiMn_2O_4$, $LiCoO_2$, $LiNiO_2$, NCM622, NCM811, $LiNi_{0.5}Mn_{1.5}O_4$, $LiFePO_4$, $LiFe_{0.2}Mn_{0.8}PO_4$, or a mixture thereof. The energy storage device may also comprise an electrolyte selected from the group consisting of an organic liquid electrolyte, a polymer electrolyte, a gel electrolyte, and an inorganic electrolyte.

According to yet another aspect of the present disclosure, a method for producing an electric bus is provided. This method generally comprises forming at least one energy storage device as described above and further defined herein followed by incorporating the at least one energy storage device into the electric bus.

DESCRIPTION OF THE DRAWINGS

In order that the disclosure may be well understood, there will now be described various forms thereof, given by way of example, reference being made to the accompanying drawings. The components in each of the drawings may not necessarily be drawn to scale, but rather emphasis is placed upon illustrating the principles of the invention.

The drawings described herein are for illustration purposes only and are not intended to limit the scope of the present disclosure in any way. It should be understood that throughout the description and drawings, corresponding reference numerals indicate like or corresponding parts and features.

DETAILED DESCRIPTION

The following description is merely exemplary in nature and is in no way intended to limit the present disclosure or its application or uses. The present disclosure generally provides a method for preparing titanium dioxide. More specifically, the present disclosure relates to the preparation of titanium dioxide that predominantly has a monoclinic crystal structure and devices that incorporate such $TiO_2$(B) material.

For the purpose of this disclosure, the terms "about" and "substantially" as used herein with respect to measurable values and ranges refer to the expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one precursor", "one or more precursors", and "precursor(s)" may be used interchangeably and are intended to have the same meaning.

According to one aspect of the present disclosure, an objective was to prepare titanium dioxide that predominantly comprises a monoclinic crystal structure using a sintering temperature below the conventional temperature of 950° C. that is required for the use of potassium titanate ($K_2Ti_4O_9$), thereby, reducing or eliminating the need for using an excess amount of $K_2CO_3$ in the preparation method. This objective was accomplished by preparing the titanium dioxide according to the method described in FIG. 1.

Figure 1:
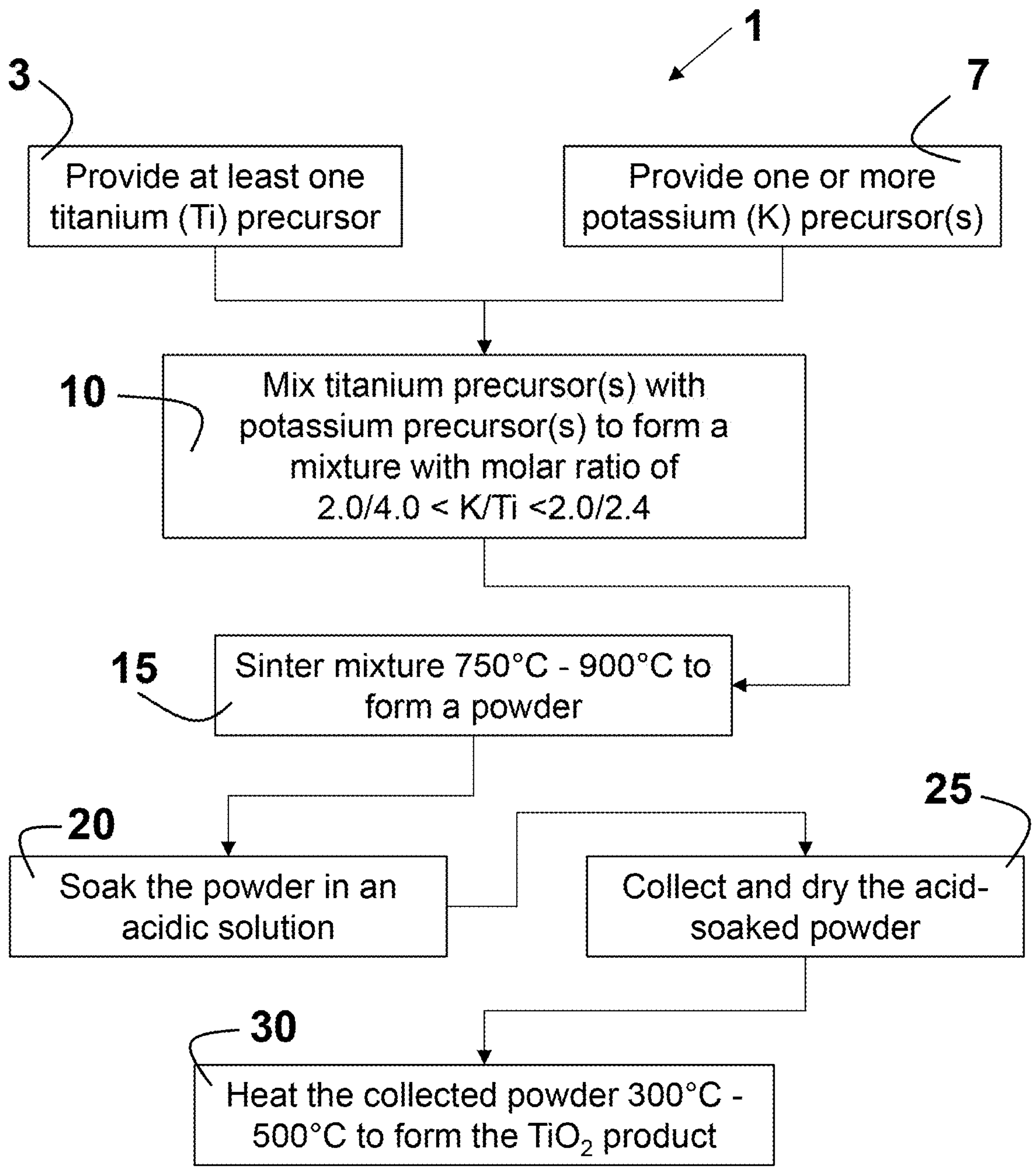
FIG. 1 is a flow chart describing a method for forming titanium dioxide according to the teachings of the present disclosure.

Referring to FIG. 1, this method 1 generally comprises providing 3 at least one titanium precursor, providing 7 one or more potassium precursors, and mixing 10 these titanium and potassium precursors together to form a mixture. The mixture is then sintered 15 at a temperature in the range of about 750° C. to 900° C. for a predetermined time to form a powder. The sintered powder is soaked 20 in an acidic solution in order for ion-exchange (e.g., $K^+ \rightarrow H+$) to occur. The acid-soaked power is collected and dried 25 with the collected/dried powder then being subjected to thermal treatment (e.g., heated) 30 in the range of 300° C. to 500° C. for a predetermined time to form the $TiO_2$ product.

Surprisingly, there is an optimized temperature range and K/Ti composition range for the synthesis of $TiO_2$(B) that provides for the best electrochemical performance. A stoichiometric molar ratio of K/Ti=2/4 for the preparation of the precursor $K_2Ti_4O_9$ does not generate a pure monoclinic phase of $TiO_2$. Rather, according to one aspect of the present disclosure, the best titanate compositions for use in the preparation of $TiO_2$(B) are represented by the formula shown in F-1 below, wherein $2.4<x<4.0$.

$$K_2Ti_xO_{1+2x} \qquad \text{F-1}$$

The synthesis temperature for the potassium titanate is not the higher the better or the lower the better. The temperature is preferred to be around 800° C. to 850° C. for the $TiO_2$ to show pure crystal phase and high capacity.

Figure 2:
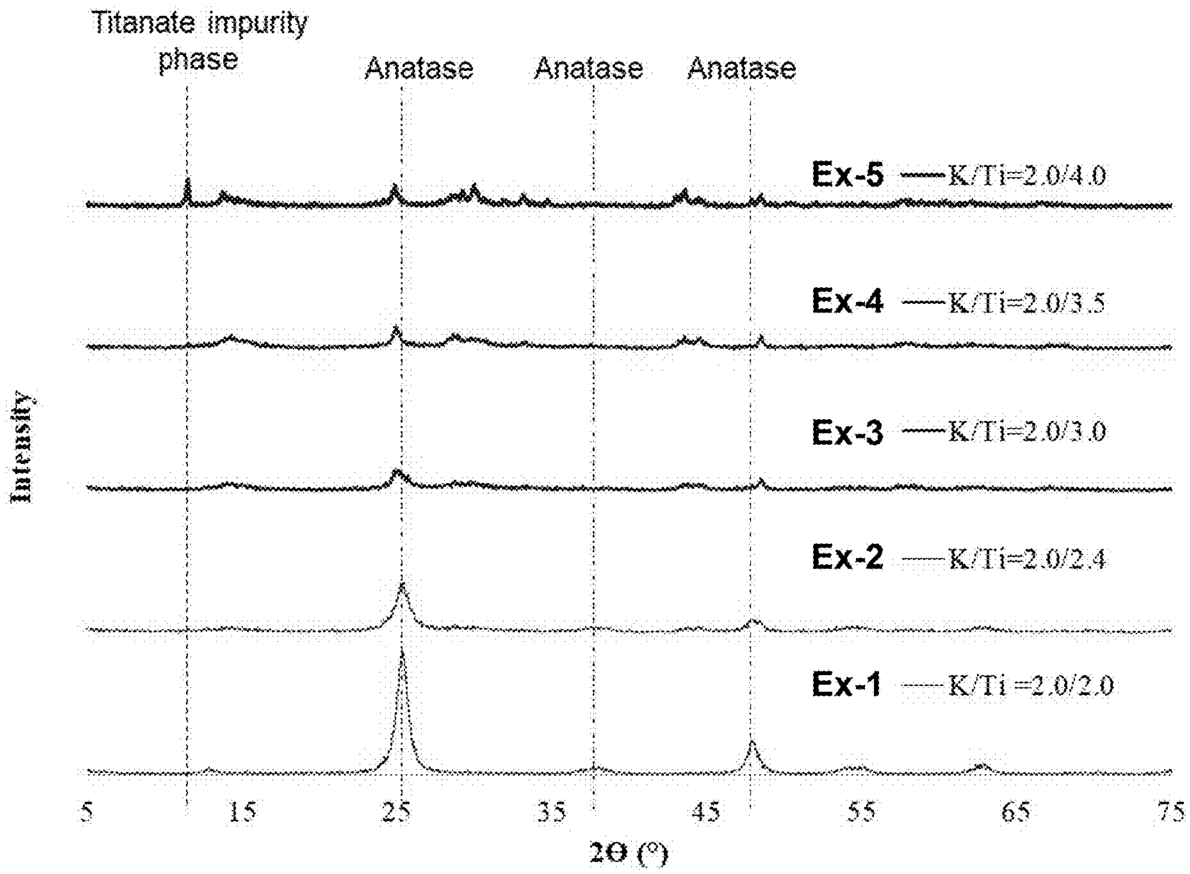
FIG. 2 is a comparison of the x-ray diffraction (XRD) patterns measured for titanium dioxide prepared with different K/Ti molar ratios according to the teachings of the present disclosure.

The synthesis conditions or parameters, as well as the titanate compositions used in the synthesis have a dramatic effect on the purity and performance of the titanium dioxide that is formed. For example, the amount of potassium (K) in the composition of potassium titanate formed during the synthesis dramatically effects the crystal structure of the titanium dioxide. Referring now to FIG. 2, a comparison of the x-ray diffraction (XRD) patterns measured for titanium dioxide prepared according to the teachings of the present disclosure is provided in which the formula F-1 for the potassium titanate formed during the synthesis allowed x to range from 2.0 to 4.0 (see Ex-1 to Ex-5).

The XRD pattern of the $TiO_2$ prepared when x=2.0 in formula F-1 exhibits a typical anatase crystal phase having a main peak at 38.0° (see Ex-1). Upon increasing the value of x in the potassium titanate formula (F-1) from 2.0 to 4.0, the XRD pattern for the prepared titanium dioxide gradually transforms from anatase (see Ex-1) to a $TiO_2$(B) crystal phase (see Ex-2<Ex-3<Ex-4~Ex-5) as exemplified by the disappearance of the XRD peak at about 38.0°. However, the formation of a peak at about 11.5° attributed to a titanate impurity appears when the value of x in the titanate formula F-1 is 4.0.

Still referring to FIG. 2, when x≤2.4 (see Ex-2) the amount of the monoclinic crystal structure present in the prepared titanium dioxide is 50 wt. % (mass %) or less relative to the overall weight or mass of the titanium dioxide. The mass percentage of the $TiO_2$(B) in the prepared titanium dioxide increases as the value of x in the titanate formula (F-1) is increased. The mass percentage for a specific material may be determined from an XRD pattern using quantitative analysis software, with or without performing Rietveld refinement. FIG. 2 demonstrates that titanium dioxide having greater than 50 wt. % $TiO_2$(B) can be prepared according to the process of the present disclosure when 2.4<x<4.0 in $K_2Ti_xO_{1+2x}$ (formula F-1) is used or formed during the process. Alternatively, the value of x in $K_2Ti_xO_{1+2x}$ (formula F-1) may range from 2.5 to 3.9; alternatively, 2.7≤x≤3.7; alternatively, 3.0≤x≤3.5. Alternatively, the value of x may also be expressed as a molar ratio of K/Ti. In other words, a value of x=2 is the same as a K/Ti ratio of 2.0/2.0, while a value of x=4 is the same as a K/Ti ratio of 2.0/4.0.

Figure 3:
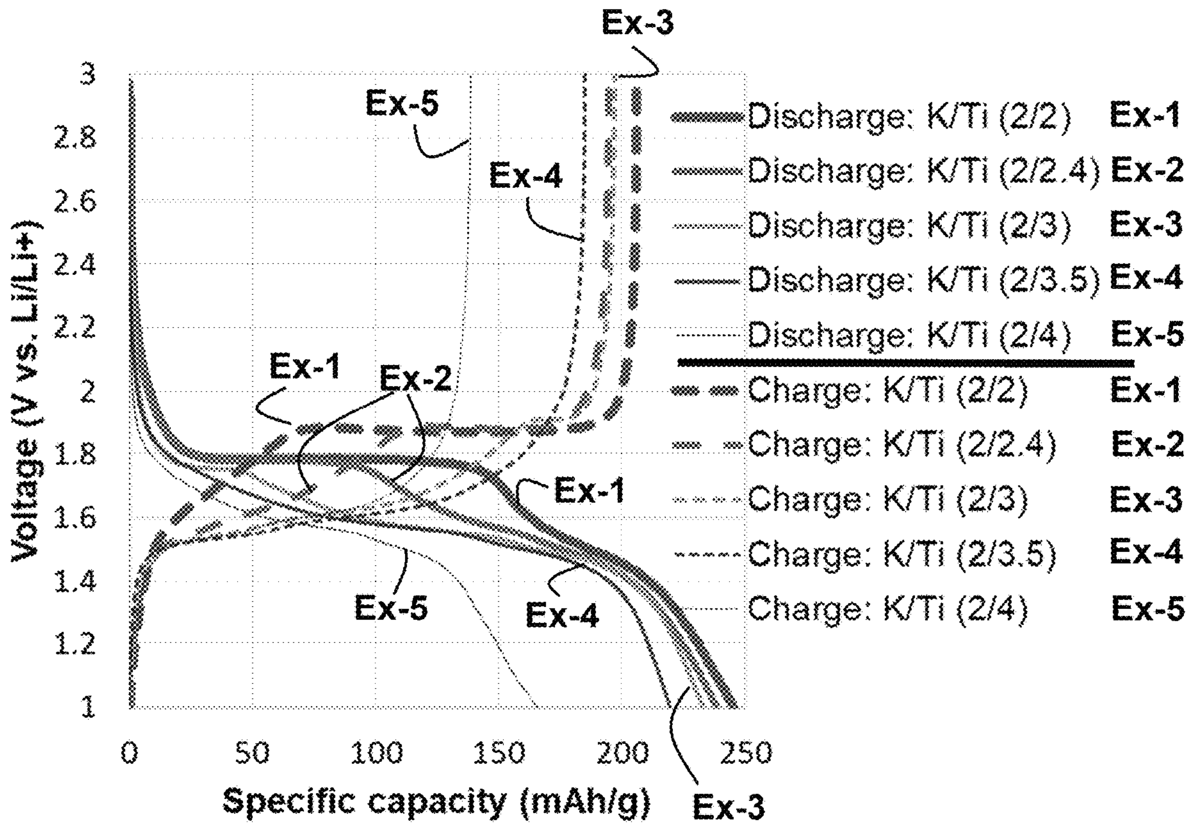
FIG. 3 is a graphical representation of the $1^{st}$ cycle charge/discharge voltage plotted as a function of specific capacity for half cells that incorporate the titanium dioxide of FIG. 2.

Referring now to FIG. 3, a comparison of the 1$^{st}$ cycle charge/discharge voltage curves obtained from half-cells that incorporate the $TiO_2$ prepared from potassium titanates having different K/Ti molar ratios (EX-1 to Ex-5) as described above for FIG. 2 is provided. In FIG. 3, The discharge (i.e., de-lithiation) curves are shown as dashed lines, while the charge curves are shown as solid lines. The half-cells (EX-1 and Ex-2) comprising $TiO_2$ prepared from titanates having K/Ti molar ratios of 2.0/2.0 (e.g., x=2.0) and 2.0/2.4 (e.g, x=2.4) exhibit a large flat voltage plateau starting at about 1.9 V, which arise from the presence of an anatase crystal phase. The half-cell comprising $TiO_2$ prepared from a titanate having a K/Ti molar ratio of 2.0/3.0 (e.g., x=3.0), exhibits a capacity from the flat voltage plateau that is much smaller as compared to the overall capacity (see Ex-3, comparing ~14 mAh/g vs ~197 mAh/g). Generally, as the titanium content increases, the existence of a flat voltage plateau decreases (i.e., less anatase crystal phase is present). However, the specific capacity seems to also decrease with an increase in titanium content. The discharge capacity for the half-cell comprising titanium dioxide prepared from a titanate having a K/Ti molar ratio of 2.0/4.0 (e.g., x=4) was measured to be only 139 mAh/g (see Ex-5), as compared to 185 mAh/g for the half-cell containing TiO2 prepared from a titanate (see Ex-4) having a K/Ti ratio of 2.0/3.5 (e.g., x=3.5). Thus, FIG. 3 demonstrates that satisfactory performance is achieved when the titanium dioxide is prepared from a titanate having a K/Ti molar ratio that is in the range of 2.0/4.0<K/Ti<2.0/2.4 (e.g., 2.4<x<4.0); alternatively, the K/Ti molar ratio is in the range of 2.0/3.5≤K/Ti≤2.0/3.0 (e.g., 3.0≤x≤3.5).

Figure 4:
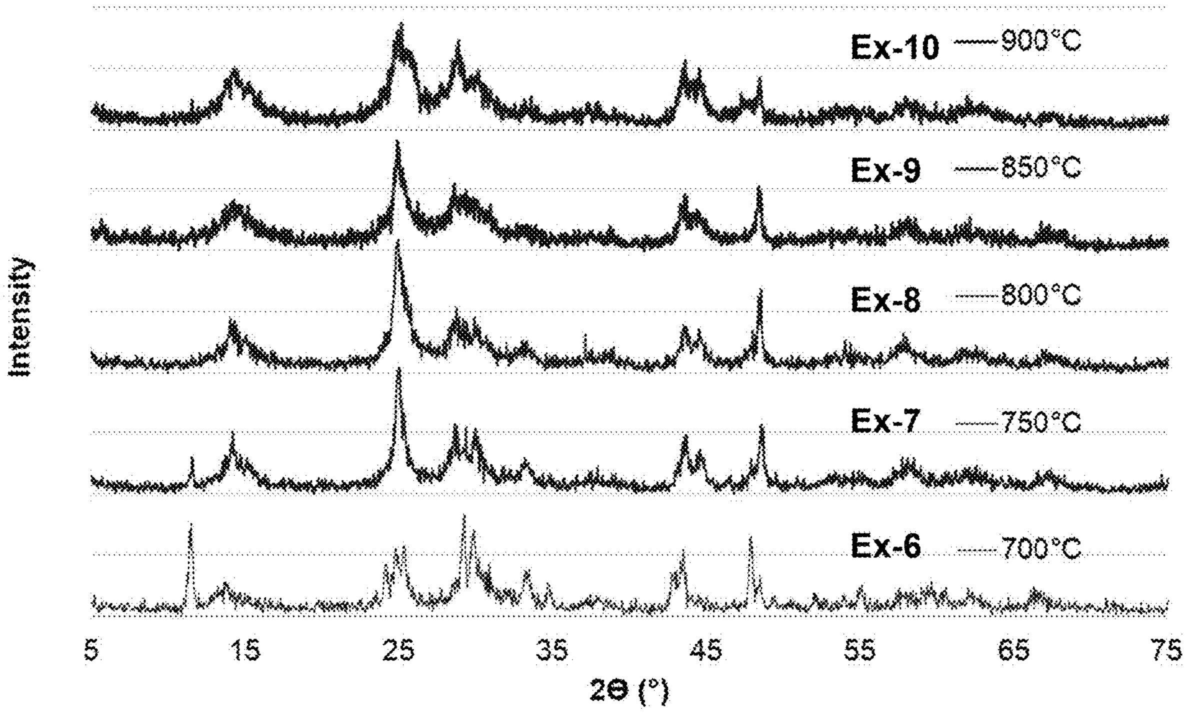
FIG. 4 is a comparison of the x-ray diffraction (XRD) patterns measured for titanium dioxide prepared according to the teachings of the present disclosure with a K/Ti molar ratio of 2.0/3.0 sintered at different temperatures.

Referring now to FIG. 4, the x-ray diffraction patterns for titanium dioxide (Ex-6 to Ex-9) prepared according the process set forth above and in FIG. 1, as well as being further defined herein, formed from a potassium titanate having x=3.0 from formula F-1 (e.g., a K/Ti molar ratio=2.0/3.0) are compared upon using a different sintering temperature. After the mixing, the precursors are heated at a high temperature or sintered. The sintering temperature needs to be high enough to form the potassium titanate crystal phase, but not too high to evaporate the $K_2CO_3$ significantly. The titanate was formed according to the process of the present disclosure and sintered in a furnace under air at a preset sintering temperature for a predetermined amount of time.

In FIG. 4, the sintering temperature was varied from 700° C. to 900° C., which is substantially lower than the conventional sintering temperature of 950° C. or 975° C. used with $K_2Ti_4O_9$. Since the melting temperature of $K_2CO_3$ is 891° C., the highest sintering temperature should be close to the melting temperature in order to reduce its evaporation rate. As further described and supported below the sintering temperature is preferred to be in the range of 750° C. to 900° C., and alternatively, between 800° C. and 850° C.

The measured XRD pattern for the $TiO_2$ prepared from the titanate sintered at 700° C. (see Ex-6), exhibits a sharp impurity peak at about 11.5°. The peak intensity for this impurity decreases as the sintering temperature increases to 750° C. (see Ex-7) and completely disappears upon reaching a sintering temperature of 800° C. (see Ex-8). The presence of this impurity peak is not observed in the XRD patterns measured for $TiO_2$ prepared from titanates sintered at 850° C. (see Ex-9) and 900° C. (see Ex-10). The comparison shown in FIG. 4 demonstrates that the sintering temperature should be >700° C.; alternatively, ≥750° C. The use of a sintering temperature above 900° C. will result in a significant amount of $K_2CO_3$ being evaporated. Alternatively, the sintering temperature may be expressed as being the range of about 750° C. to 900° C.; alternatively, about 775° C. to about 875° C.; alternatively, about 800° C. to about 850° C.

Still referring to FIG. 4, the sintering of the titanate was performed on each sample at the selected temperature for a period of 10 hours. Alternatively, the predetermined amount of time over which the sintering is performed may range from a few hours to a few days; alternatively, from 0.5 hours to 96 hours; alternatively, 1 hour to 84 hours; alternatively, 1 hour to 72 hours; alternatively, 1 hour to 60 hours; alternatively, alternatively, 2 hours to 48 hours; alternatively, 2 hours to 36 hours; alternatively, 2 hours to 18 hours.

Figure 5:
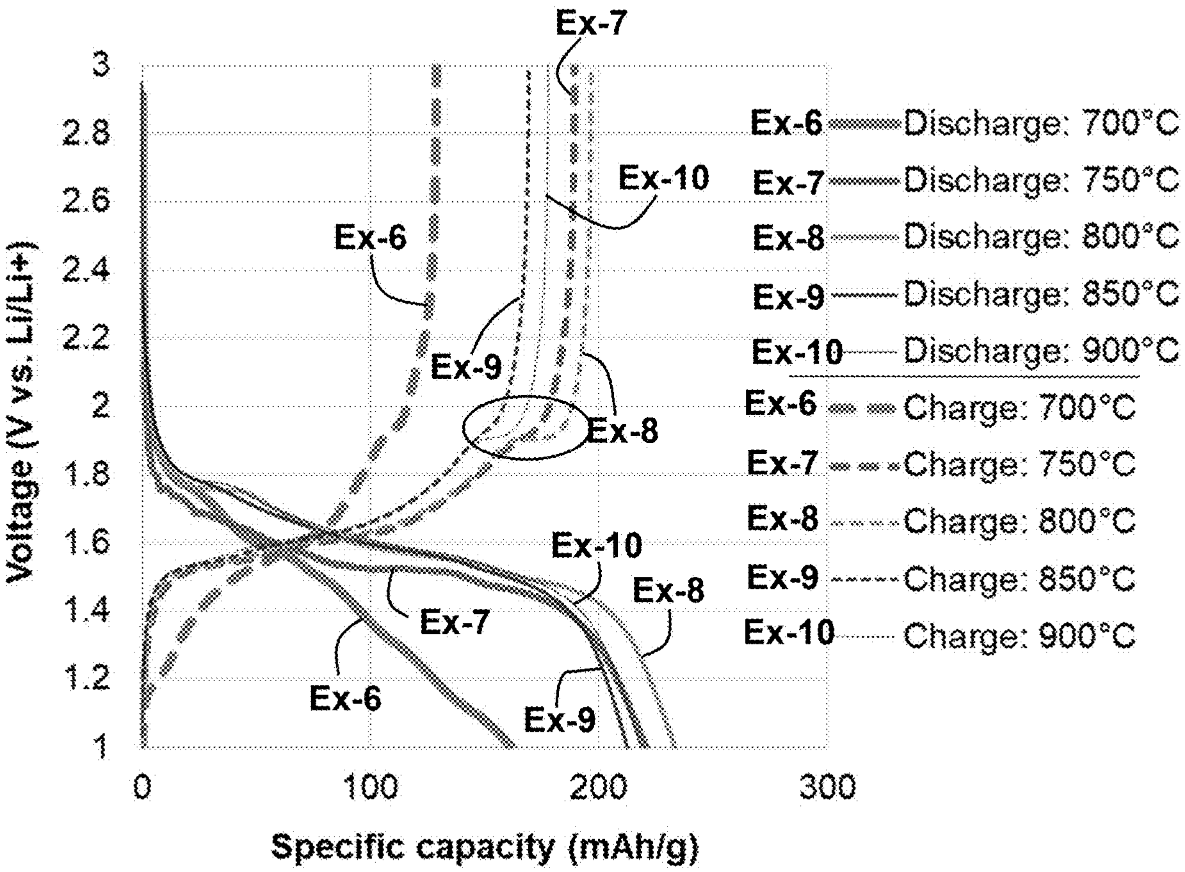
FIG. 5 is a graphical representation of the $1^{st}$ cycle charge/discharge voltage plotted as a function of specific capacity for half cells that incorporate the titanium dioxide of FIG. 4.

Referring now to FIG. 5, a comparison of the 1$^{st}$ cycle charge/discharge voltage curves obtained from half-cells that incorporate the $TiO_2$ prepared from potassium titanates sintered at different temperatures (EX-6 to Ex-10) as described above for FIG. 4 is provided. In FIG. 5, the discharge (i.e., de-lithiation) curves are shown as dashed lines, while the charge curves are shown as solid lines. In FIG. 5, the half-cell comprising the titanium dioxide sintered at 700° C. (Ex-6) exhibited a very low capacity value of 129 mAh/g. The specific capacity exhibited by the other half-cells (Ex-7 to Ex-10), which were sintered at temperatures ranging between 750° C. to 900° C., was measured to be ≥170 mAh/g. This capacity value is acceptable since it is close to or higher than the specific capacity exhibited by $Li_4Ti_5O_{12}$ (i.e., 155 mAh/g to 175 mAh/g). The charge curves from the samples sintered at 750° C. and 900° C. showed a short voltage plateau at about 1.9 V, which suggests the anatase impurity in the samples. The samples sintered at 800° C. and 850° C. showed less anatase impurity and also delivered high capacities, which are preferred as the anode active materials. FIG. 5 demonstrates that $TiO_2$(B) prepared according to the process of the present disclosure may be competitive with commercially available $Li_4Ti_5O_{12}$, provided the sintering temperature is >700° C. and the more preferred temperatures are about 800° C. to 850° C.

Referring once again to FIG. 1, the titanium precursor that is provided 3 may be selected as, but not limited to, an oxide of titanium, such as titanium dioxide that is amorphous or has a crystal phase of anatase, rutile, brookite, or a mixture thereof; or at least one titanium compound, including, without limitation, titanium alkoxides, ammonium titanium oxalate, titanium chloride, and titanium sulfate. Alternatively, the titanium precursor is $TiO_2$.

The potassium precursor that is provided 7 may be selected as, but not limited to, one or more potassium compounds, including, without limitation, $K_2CO_3$, $KHCO_3$, KOH, KCl, $K_2SO_4$, and $KNO_3$. Alternatively, the potassium compound is $K_2CO_3$.

The titanium precursor(s) and potassium precursor(s) are weighed and then mixed 10 together to form a mixture with a K/Ti molar ratio of $2.0/4.0 \le K/Ti \le 2.0/2.4$. This mixing may be accomplished in various ways, such as, for example, any conventional methods, including, without limitation, grinding, attrition milling, dry ball milling, jet milling, wet ball milling, or the like. The mixing 10 of the precursors is carried out to homogenously distribute or disperse the precursor(s) in order to ensure that the sintered potassium titanate will have high crystal purity.

After mixing, the mixture is sintered 15 in a furnace at a high temperature (750° C.-900° C.) in air. Performing the sintering in air is desirable in order to maintain a low production cost. However, one skilled in the art will understand that sintering 15 may also be carried out in an inert gas environment, such as $N_2$ or Ar, when desirable, without exceeding the scope of the present disclosure. The sintering 15 step may also be accomplished in a reducing gas environment, such as, without limitation, in $H_2$, ammonia, CO, $C_2H_2$, $C_2H_4$, and $CH_4$ in order to enhance electronic conductivity.

After sintering, the powder is dispersed or soaked 20 in an acidic solution in order to perform ion-exchange. In this step, $K^+$ ions are exchanged with $H^+$ ions from the acid. A mineral acid may be used, which includes, without limitation, HCl, $HNO_3$, $H_2SO_4$, and $H_3PO^4$. The soaking time may range from a few hours to a few days; alternatively, about 3 hours to 2 days; alternatively, about 4 hours to 48 hours; alternatively, about 6 hours to about 18 hours. The ion-exchange process may be carried out at room temperature (e.g., about 20° C. to 25° C.) or at a relatively warm temperature, e.g., up to 100° C. In other words, the temperature may be within the range of about 30° C. to 100° C.; alternatively, in the range of about 45° C. to about 80° C. Alternatively, the soaking temperature ranges from room temperature to about 60° C.

After soaking 20, the acid-soaked powder is collected 25 through filtering and washed with copious amounts of water. Other methods such as centrifuging may also be used to collect the ion-exchanged powder without exceeding the scope of the present disclosure. The washed powder is then dried in an oven and finally de-hydrated by thermal treatment 30 in a furnace at a temperature in the range of 300° C. to 500° C.; alternatively, in the range of about 350° C. to about 450° C. In this step, the obtained hydrogen titanate is heated to remove the water to become $TiO_2$. If the temperature is too low, it may not be able to de-hydrate the powder completely. If the temperature is too high, the $TiO_2$(B) may become unstable and convert into an anatase crystal phase, which is not preferred because of the high de-lithiation voltage plateau associated therewith. The heating time or time associated with this thermal treatment may range from a few minutes to a few hours. The heating environment may be in air, in an inert gas, in a reducing gas, or in an oxidizing gas.

According to another aspect of the present disclosure, the potassium titanate formed and used to prepare $TiO_2$(B) according to the teachings of the present disclosure, has a K/Ti molar ratio in the range of $2/4 < K/Ti < 2/2.4$; alternatively, $2/3.5 \le K/Ti \le 2/3$. The potassium titanate may have a small percentage of at least one more element besides K, Ti, and O as a dopant or as a coating layer. The additional element(s) or dopant (D) may be selected from any element from the element table, including, without limitation, Li, Mg, Ca, Al, Nb, W, Mo, P, and a combination thereof. Alternatively, the dopant (D) comprises, but is not limited to V, Cr, Mn, Fe, Co, Ni, Cu, Zn, La, Ce, Sb, Bi, or a mixture thereof. The molar concentration of the additional element(s) or dopant (D) is much smaller than the molar concentrations of K, Ti, O present in the potassium titanate. More specifically, the molar ratio of the additional elements or dopant to titanium (D/Ti) is ≤0.3; alternatively, ≤0.2; alternatively, ≤0.1.

According to another aspect of the present disclosure, the $TiO_2$(B) prepared according to the teachings of the present disclosure may be used as an anode active material in an energy storage device, similar to $Li_4Ti_5O_{12}$. When it is used as an anode active material, the cathode active material may be selected from $LiMn_2O_4$, $LiCoO_2$, $LiNiO_2$, NCM622, NCM811, $LiNi_{0.5}Mn_{1.5}O_4$, $LiFePO_4$, and $LiFe_{0.2}Mn_{0.8}PO_4$. When desirable, the electrolyte used in the energy storage device may be an organic electrolyte with at least one dissolved lithium salt. The electrolyte may also be a polymer electrolyte, a gel electrolyte, or an inorganic electrolyte. The energy storage device may be a lithium ion cell.

Figure 6:
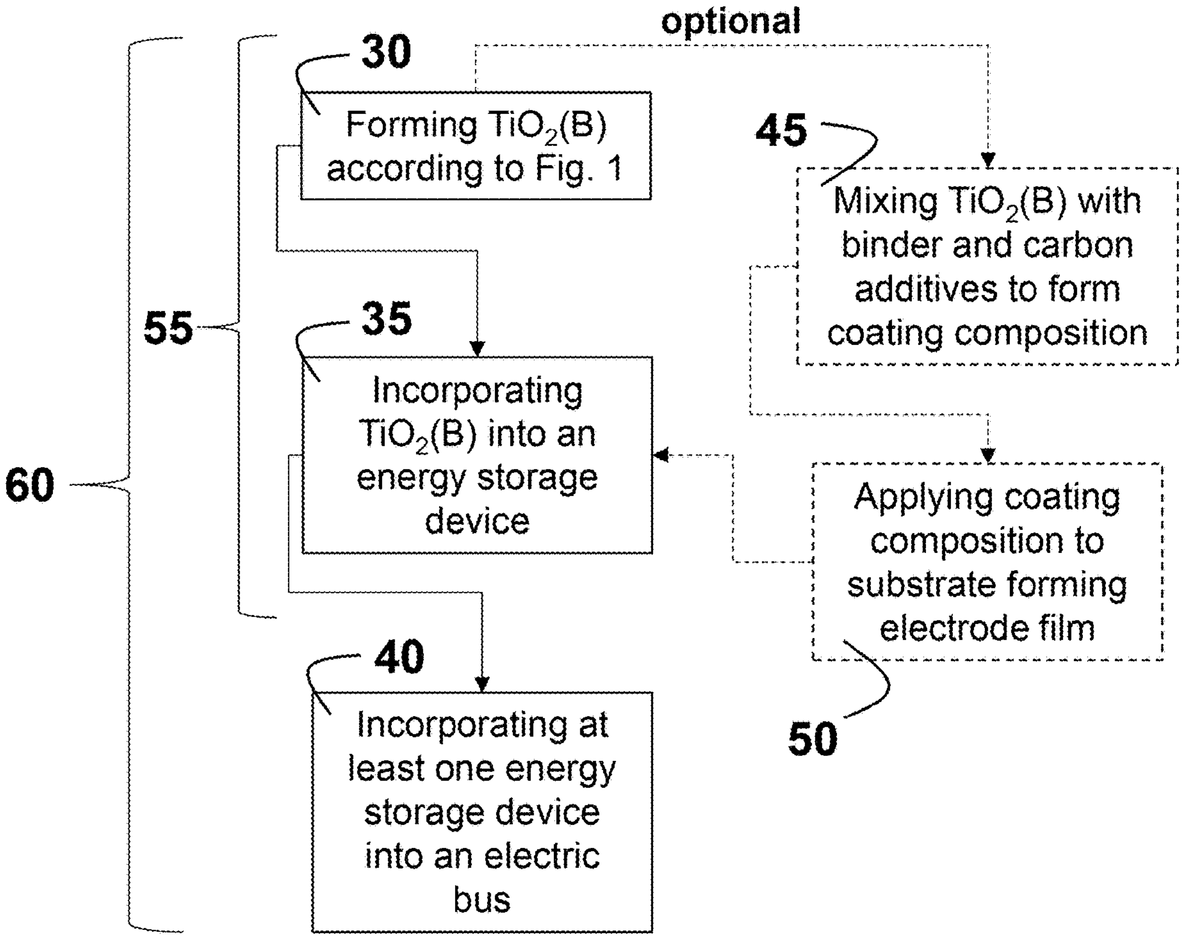
FIG. 6 is a flowchart of a method for forming an energy storage device and an electric bus that incorporates the energy storage device formed using the titanium dioxide prepared in FIG. 1 according to the teachings of the present disclosure.

Referring now to FIG. 6, an energy storage device may be prepared 55 by a method that comprises forming 30 $TiO_2$(B) according to the method previously described above (e.g., FIG. 1) and as further defined herein, followed by the incorporation 35 of this $TiO_2$(B) into an energy storage device. In a similar fashion an electric bus may be formed 60 herein by first making energy storage device(s) according to the above described method 55 followed by incorporating 40 at least one of these energy storage device(s) into the electric bus.

When the $TiO_2$(B) is used as an anode active material, the $TiO_2$(B) may be mixed 45 with a polymer binder and carbon additives to form a coating composition with the active material mass percentage being in the range of 1% to 99% relative to the overall mass of the coating composition. This coating composition may then be applied 50 to a substrate, thereby, forming an electrode film. When desirable, it is possible that an additional anode active material may be included into the electrode along with $TiO_2$(B) at a mass percentage of 1% to 99%. This additional anode material may be selected from, but not limited to, $Li_4Ti_5O_{12}$, $Nb_2O_5$, $WO_3$, $WO_2$, $MoO_3$, $MoO_2$, $Sb_2O_5$, and mixtures thereof.

Experimental Details

Synthesis: For the synthesis of $K_2Ti_3O_7$, 5.99 gram of $TiO_2$ and 3.46 grams of $K_2CO_3$ was mixed together by hand grinding. The powder was sintered at 800° C. in air for 10 hours. Then obtained powder was ground by hand and sintered at 800° C. in air for an additional 10 hours. The sintered powder was stirred in a 700 ml of an HCl solution (1 Molar) for 2 days, followed by filtering and washing. The washed powder was then dried in a conventional oven for 1 hour. The dried powder was finally heated at 350° C. for 4 hours in air. The $K_2CO_3$ amount and the sintering temperature were adjusted for the synthesis of other potassium titanate samples.

Material characterization: XRD patterns were collected using a Rigaku benchtop Diffractometer.

Electrode and half-cell fabrication: The electrode was fabricated by a doctor blade coating process. A slurry was made with 92% of $TiO_2$, 3% of polyvinylidene fluoride (PVDF) and 5% C65 carbon black in N-methylpyrrolidone (NMP) after spinning with a Thinky Mixer. The slurry was applied to Aluminum foil by a doctor blade to form a thin coating. The coating was then dried in vacuum oven. The dried coating was cut into small disks after calendaring. After measuring the areal mass loading and electrode film thickness, the disk electrode was assembled in a half-cell with lithium as the negative electrode and the disk electrode as the positive electrode.

Cell test: The half-cell was tested in an Arbin tester for capacity check. The cell was charged/discharge at C/10 rate between 1.0 V and 3.0 V vs. $Li/Li^+$.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for preparing titanium oxide ($TiO_2$) as an active battery material, the method comprising:

Providing at least one titanium precursor;

Providing one or more potassium precursors;

Mixing the at least one titanium precursor with the one or more potassium precursors to form a mixture; wherein the mixture has a potassium to titanium (K/Ti) molar ratio in the range of 2/3.5 to 2/3;

Sintering the mixture at a temperature in the range of 800° C. to 850° C. for a predetermined time to form a powder;

Soaking the powder in an acidic solution to form an acid-soaked powder;

Collecting and drying the acid-soaked powder; and

Treating the collected powder thermally at a temperature in the range of 300° C. to 500° C. for a predetermined time to form the $TiO_2$.

2. The method according to claim 1, wherein the $TiO_2$ comprises $TiO_2$(B) having a monoclinic crystal structure as its major crystal phase with a mass percentage that is >50% of the overall mass of the $TiO_2$.

3. The method according to claim 1, wherein the $TiO_2$ further comprises an anatase crystal phase with a mass percentage that is greater than 0% and less than 50%.

4. The method according to claim 1, wherein the titanium precursor is an oxide of titanium.

5. The method according to claim 4, wherein the titanium precursor exhibits an amorphous structure, an anatase crystal structure, a rutile crystal structure, or a brookite crystal structure.

6. The method according to claim 1, wherein the potassium precursor is at least one selected from the group consisting of KHCO3, KOH, KCl, K2SO4, KNO3, $K_2CO_3$, and a mixture thereof.

7. The method according to claim 6, wherein the potassium precursor is $K_2CO_3$.

8. The method according to claim 1, wherein the $TiO_2$ further comprises a dopant (D), wherein the dopant includes at least one element other than potassium, titanium, or oxygen.

9. The method according to claim 8, wherein the dopant (D) comprises Li, Mg, Ca, Sr, Ba, Nb, W, Zr, Mo, Al, C, Si, Sn, Pb, or a mixture thereof.

10. The method according to claim 8, wherein the dopant (D) comprises V, Cr, Mn, Fe, Co, Ni, Cu, Zn, La, Ce, Sb, Bi, or a mixture thereof.

11. The method according to claim 8, wherein the molar ratio of dopant to titanium (D/Ti) is ≤0.3.

12. The method according to claim 1, wherein the acid solution comprises $H_2SO_4$, HCl, $HNO_3$, $H_3PO_4$, or mixture thereof.

13. The method according to claim 1, wherein the thermal treatment of the collected and dried powder is performed at a temperature in the range of 350° C. to 450° C.

14. A method for producing an energy storage device, the method comprising:

Forming $TiO_2$(B) according to claim 2; and

Incorporating the $TiO_2$(B) into the energy storage device.

15. The method according to claim 14, wherein the energy storage device is a lithium ion cell.

16. A method for producing an electric bus, the method comprising:

forming at least one energy storage device according to claim 14; and incorporating the at least one energy storage device into the electric bus.

17. The method according to claim 14, wherein the method further comprises:

Mixing the $TiO_2$(B) with a binder and carbon additives to form a coating composition; and Applying the coating composition to a substrate to form an electrode film having a mass percentage of $TiO_2$(B) in the range of 1% to 99%.

18. The method according to claim 14, wherein the energy storage device comprises one or more of the following:

at least one cathode active material selected from $LiMn_2O_4$, $LiCoO_2$, $LiNiO_2$, NCM622, NCM811, $LiNi_{0.5}Mn_{1.5}O_4$, $LiFePO_4$, $LiFe_{0.2}Mn_{0.8}PO_4$, or a mixture thereof; and an electrolyte selected from the group consisting of an organic liquid electrolyte, a polymer electrolyte, a gel electrolyte, and an inorganic electrolyte.

* * * * *